(12) United States Patent
Nakajima et al.

(10) Patent No.: US 8,563,646 B2
(45) Date of Patent: Oct. 22, 2013

(54) ADHESIVE COMPOSITION

(75) Inventors: Shigeo Nakajima, Tokyo (JP); Yukinori Nakamichi, Tokyo (JP)

(73) Assignees: Asahi Kasei Chemicals Corporation, Tokyo (JP); Japan Elastomer Co., Ltd., Tokyo (JP)

( * ) Notice: Subject to any disclaimer, the term of this patent is extended or adjusted under 35 U.S.C. 154(b) by 307 days.

(21) Appl. No.: 12/937,404

(22) PCT Filed: Apr. 10, 2009

(86) PCT No.: PCT/JP2009/057333
§ 371 (c)(1),
(2), (4) Date: Oct. 12, 2010

(87) PCT Pub. No.: WO2009/128397
PCT Pub. Date: Oct. 22, 2009

(65) Prior Publication Data
US 2011/0034614 A1    Feb. 10, 2011

(30) Foreign Application Priority Data

Apr. 14, 2008  (JP) .................................. 2008-104948

(51) Int. Cl.
C08L 53/00    (2006.01)

(52) U.S. Cl.
USPC ........................................... 524/505; 525/89

(58) Field of Classification Search
USPC .................. 525/98, 338; 524/505; 428/355 R
See application file for complete search history.

(56) References Cited

U.S. PATENT DOCUMENTS

| | | | |
|---|---|---|---|
| 3,239,478 A | 3/1966 | James | |
| 3,281,383 A | 10/1966 | Zelinski et al. | |
| 3,333,024 A | 7/1967 | Haefele et al. | |
| 4,501,857 A | 2/1985 | Kishimoto et al. | |
| 4,603,155 A | 7/1986 | Muramori et al. | |
| 4,673,714 A | 6/1987 | Kishimoto et al. | |
| 4,994,508 A | 2/1991 | Shiraki et al. | |
| 2002/0147274 A1* | 10/2002 | Sasagawa et al. ............... | 525/98 |
| 2005/0038198 A1 | 2/2005 | Morishita et al. | |
| 2008/0070053 A1 | 3/2008 | Schmierer et al. | |
| 2010/0015442 A1 | 1/2010 | Shimoura et al. | |

FOREIGN PATENT DOCUMENTS

| | | |
|---|---|---|
| CA | 1034289 | 7/1978 |
| EP | 0 757 066 | 2/1997 |
| EP | 0 902 051 | 3/1999 |
| JP | 36-019286 | 10/1961 |
| JP | 42-008704 | 4/1967 |
| JP | 43-006636 | 3/1968 |
| JP | 43-017979 | 7/1968 |
| JP | 44-17037 | 7/1969 |
| JP | 46-032415 | 9/1971 |
| JP | 49-036957 | 4/1974 |
| JP | 56-028925 | 7/1981 |
| JP | 56-049958 | 11/1981 |
| JP | 59-166518 | 9/1984 |
| JP | 61-261310 | 11/1986 |
| JP | 61-278578 | 12/1986 |
| JP | 63-004841 | 2/1988 |
| JP | 63-248817 | 10/1988 |
| JP | 64-81877 | 3/1989 |
| JP | 1-37970 | 8/1989 |
| JP | 1-53851 | 11/1989 |
| JP | 2-9041 | 2/1990 |
| JP | 5-93176 | 4/1993 |
| JP | 5-069874 | 10/1993 |
| JP | 6-145626 | 5/1994 |
| JP | 7-157738 | 6/1995 |
| JP | 9-104848 | 4/1997 |
| JP | 9-291266 | 11/1997 |
| JP | 11-61070 | 3/1999 |
| JP | 2000-309767 | * 11/2000 |
| JP | 2003-238928 | 8/2003 |
| JP | 2004-238548 | * 8/2004 |
| JP | 2006-1092 | 1/2006 |
| WO | 01/85818 | 11/2001 |
| WO | 2007/126081 | 11/2007 |

OTHER PUBLICATIONS

"Secchaku (Technology on Adhesion & Sealing)", vol. 32, No. 1, p. 27, 1988, along with a partial English language translation.
Partial English language translation of JP 44-17037 published Jul. 28, 1969.
Partial English language translation of JP 56-049958 published May 2, 1981.
Partial English language translation of JP 36-019286 published Oct. 13, 1961.
Partial English language translation of JP 43-017979 published Jul. 30, 1968.
Partial English language translation of JP 46-032415 published Sep. 21, 1971.
Partial English language translation of JP 42-008704 published Apr. 20, 1987.
Partial English language translation of JP 43-006636 published Mar. 12, 1968.
English language Abstract for JP 61-033132, corresponding to JP 1-53851 published Nov. 15, 1989.
English language Abstract for JP 62-207303, corresponding to JP 2-9041 published Feb. 28, 1990.
International Search Report for PCT/JP2009/057333, mailed Jun. 23, 2009.
Supplementary European Search Report for European Patent Application No. 09732612.8, dated Mar. 31, 2011.
International Preliminary Report on Patentability for PCT/JP2009/057333, dated Dec. 9, 2010.

* cited by examiner

*Primary Examiner* — Hui Chin
(74) *Attorney, Agent, or Firm* — Greenblum & Bernstein, P.L.C.

(57) ABSTRACT

An adhesive composition having good balance in tackiness properties such as tack strength and retentivity, low melt viscosity, high processability, and high stability in melt viscosity under high temperature heating is provided. An adhesive composition containing two hydrogenated block copolymers and a predetermined tackifier is provided, the two hydrogenated block copolymers each having a different structure obtained by controlling the degree of hydrogenation of a block copolymer of a conjugated diene compound and a vinyl aromatic hydrocarbon in a particular range.

4 Claims, No Drawings

ADHESIVE COMPOSITION

TECHNICAL FIELD

The present invention relates to an adhesive composition containing hydrogenated block copolymer having a predetermined structure and a tackifier.

BACKGROUND ART

Conventionally, hot-melt adhesives have been widely used because those are excellent from environmental viewpoints and for their convenience.

As a base polymer for the hot-melt adhesives, vinyl aromatic hydrocarbon-conjugated diene based block copolymers (SBS) are known for their high versatility.

Also in the related art, an adhesive composition using the block copolymer has been disclosed (for example, see Patent Literatures 1 and 2.). Generally, however, the SBS has poor thermal stability, and the adhesive composition using this is likely to be less balanced between retentivity and tackiness, and have high melt viscosity and insufficient processability. For this reason, an adhesive composition composed of a triblock copolymer and a diblock copolymer has been proposed as an improved technique for these (for example, see Patent Document 3 and Non Patent Document 1.).

Moreover, an adhesive composition composed of a block copolymer obtained by performing coupling with a specific bifunctional coupling agent (an aliphatic monoester, a specific dihalogen compound) has been proposed (for example, see Patent Document 4.).

Further, a composition containing a block copolymer obtained by hydrogenating a block copolymer of a vinyl aromatic hydrocarbon and a conjugated diene based compound and a tackifier has been proposed as further improvement of these related arts (for example, see Patent Document 5.).

Patent Document 1: Japanese Patent Publication No. 44-17037
Patent Document 2: Japanese Patent Publication No. 56-49958
Patent Document 3: Japanese Patent Application Laid-Open No. 61-278578
Patent Document 4: Japanese Patent Application Laid-Open No. 61-261310
Patent Document 5: Japanese Patent Publication No. 05-69874
Non Patent Document 1: "Secchaku (Adhesion)" (vol. 32, No. 1, p. 27 ('88))

SUMMARY OF THE INVENTION

Problems to be Solved by the Invention

However, each of the above-mentioned related arts needs to be much further improved in order to satisfy all the properties that while the retentivity and the tackiness are kept well-balanced, the melt viscosity is reduced simultaneously, and high stability in the melt viscosity is attained under high temperature.

Then, an object of the present invention is to provide an adhesive composition satisfying these properties.

Means for Solving the Problems

As a result of repeated extensive research in order to solve the problems of the above-mentioned related arts, the present inventors found out that an adhesive composition containing a predetermined amount of a hydrogenated block copolymer having a specific structure and a predetermined amount of a tackifier can solve the above-mentioned problems, and completed the present invention.

Namely, the present invention is as follows.

[1] An adhesive composition comprising 100 parts by mass of (1) a hydrogenated block copolymer having 30 to 90% by mass of (1-A) below and 70 to 10% by mass of (1-B) below and 20 to 400 parts by mass of (2) a tackifier is provided.

(1-A) A hydrogenated block copolymer that comprises a polymer block mainly composed of a vinyl aromatic hydrocarbon and a polymer block mainly composed of a conjugated diene compound, and satisfies requirements (a) to (c) below:

(a) a total degree of hydrogenation H (%) of unsaturated double bonds based on the conjugated diene compound is 10 to 80%, (b) a content of the vinyl aromatic hydrocarbon is 20 to 60% by mass, and (c) a peak molecular weight is 30,000 to 60,000.

(1-B) A hydrogenated block copolymer that comprises a polymer block mainly composed of not less than two vinyl aromatic hydrocarbons and a polymer block mainly composed of a conjugated diene compound, and satisfies requirements (d) to (f) below:

(d) a total degree of hydrogenation H (%) of unsaturated double bonds based on the conjugated diene compound is 10 to 80%, (e) a content of the vinyl aromatic hydrocarbons is 20 to 60% by mass, and (f) a peak molecular weight is more than 60,000 and less than 100,000.

[2] The adhesive composition described in [1] above is provided, in which the (1-A) hydrogenated block copolymer is a hydrogenated block copolymer of a block copolymer including a polymer block mainly composed of a vinyl aromatic hydrocarbon and a polymer block mainly composed of a conjugated diene compound, and having 10 to 80% of a vinyl bond amount V (%) based on the conjugated diene compound; a degree of hydrogenation S (%) of vinyl bonds in conjugated diene before hydrogenation is not less than 82%; and the total degree of hydrogenation H (%) of unsaturated double bonds based on the conjugated diene compound satisfies a relationship of V≤H≤2×V+10 (wherein 10≤H≤80); and the (1-B) hydrogenated block copolymer is a hydrogenated block copolymer of a block copolymer having 10 to 80% of a vinyl bond amount V (%) based on the conjugated diene compound; a degree of hydrogenation S (%) of vinyl bonds in conjugated diene before hydrogenation is not less than 82%; the total degree of hydrogenation H (%) of unsaturated double bonds based on the conjugated diene compound satisfies a relationship of V≤H≤2×V+10 (wherein 10≤H≤80); and the peak molecular weight is 65,000 to 95,000.

[3] The adhesive composition described in [1] or [2] above, further containing a softener.

Advantageous Effects of the Invention

According to the present invention, an adhesive composition having a low melt viscosity and practically good tack strength and retentivity, and has high thermal stability in the melt viscosity and good loop tack, and well-balanced adhesion performance as a whole is obtained.

MODE FOR CARRYING OUT THE INVENTION

Hereinafter, an embodiment for implementing the present invention (hereinafter, referred to as the "present embodiment") will be described in detail. The present invention will not be limited to the embodiment below, and various modifications can be made and implemented within the scope of the gist.

An adhesive composition according to the present embodiment is an adhesive composition containing 100 parts by mass of (1) a hydrogenated block copolymer containing 30 to 90% by mass of (1-A) below and 70 to 10% by mass of (1-B) below, and 20 to 400 parts by mass of (2) a tackifier.

[(1): Hydrogenated Block Copolymer]

The (1-A) is a hydrogenated block copolymer that has a polymer block mainly composed of a vinyl aromatic hydrocarbon and a polymer block mainly composed of a conjugated diene compound, and satisfies requirements (a) to (c) below:

(a) the total degree of hydrogenation H (%) of unsaturated double bonds based on the conjugated diene compound is 10 to 80%, (b) the content of the vinyl aromatic hydrocarbon is 20 to 60% by mass, and (c) the peak molecular weight is 30,000 to 60,000.

The (1-B) is a hydrogenated block copolymer that has a polymer block mainly composed of not less than two vinyl aromatic hydrocarbons and a polymer block mainly composed of a conjugated diene compound, and satisfies the requirements (d) to (f) below:

(d) the total degree of hydrogenation H (%) of unsaturated double bonds based on the conjugated diene compound is 10 to 80%, (e) the content of the vinyl aromatic hydrocarbons is 20 to 60% by mass, and (f) the peak molecular weight is more than 60,000 and less than 100,000.

Hereinafter, the (1-A) hydrogenated block copolymer and the (1-B) hydrogenated block copolymer will be described in detail.

Examples of monomeric units of the vinyl aromatic hydrocarbon that constitutes the hydrogenated block copolymers of the (1-A) and the (1-B) include alkyl styrene such as styrene, α-methylstyrene, p-methylstyrene, and p-tert-butylstyrene, p-methoxystyrene, and vinyl naphthalene. Particularly, styrene is preferable. These may be used alone, or may be used in combination of two or more.

The conjugated diene compound that constitutes the hydrogenated block copolymers of the (1-A) and the (1-B) is a diolefin having one pair of conjugated double bonds.

Examples thereof include 1,3-butadiene, 2-methyl-1,3-butadiene (isoprene), 2,3-dimethyl-1,3-butadiene, 1,3-pentadiene, and 1,3-hexadiene. These may be used alone, or may be used in combination of two or more.

The block copolymers before hydrogenation of the hydrogenated block copolymers of the (1-A) and the (1-B) can be each produced with a known polymerization method.

For example, methods disclosed in Japanese Patent Publication No. 36-19286, Japanese Patent Publication No. 43-17979, Japanese Patent Publication No. 46-32415, Japanese Patent Publication No. 49-36957, Japanese Patent Publication No. 56-28925, and Japanese Patent Application Laid-Open No. 59-166518 can be applied.

The block copolymer at a stage prior to hydrogenation of the (1-A) hydrogenated block copolymer is represented by the general formulas: $(C-D)_m$ and $D-(C-D)_m$. m is an integer of not less than one, and usually an integer of 1 to 5. in terms of tackiness, it is preferable that a terminal is a block D. The structure of C-D is most preferable in terms of tackiness and melt viscosity.

Here, C is a polymer block mainly composed of a vinyl aromatic hydrocarbon, and D is a polymer mainly composed of a conjugated diene compound.

The boundary between the C block and the D block does not always need to be distinguished clearly.

The block copolymer of the (1-B) hydrogenated block copolymer at a stage prior to hydrogenation is represented by the general formulas: $(C-D)_n$, $C-(D-C)_m$, and $D-(C-D)_m$.

Here, C is a polymer block mainly composed of a vinyl aromatic hydrocarbon, and D is a polymer mainly composed of a conjugated diene compound.

The boundary between the C block and the D block does not always need to be distinguished clearly.

Moreover, n is an integer of not less than two, and m is an integer of not less than one and usually an integer of 1 to 5.

The block copolymer of the (1-B) hydrogenated block copolymer at a stage prior to hydrogenation can be represented by the general formulas: $[(D-C)_n]_{m+1}-X$, $[(C-D)_n]_{m+1}-X$, $[(D-C)_n-D]_{m+1}-X$, and $[(C-D)_n-C]_{m+1}-X$.

Here, C is a polymer block mainly composed of a vinyl aromatic hydrocarbon, and D is a polymer mainly composed of a conjugated diene compound.

The boundary between the C block and the D block does not always need to be distinguished clearly.

Moreover, n is an integer of not less than two.

X designates a residue of a coupling agent such as tetrachlorosilane, tin tetrachloride, epoxidized soybean oil, bifunctional to hexafunctional epoxy group containing compounds, polyhalogenated hydrocarbons, carboxylate esters, and polyvinyl compounds such as divinylbenzenes, or a residue of an initiator such as polyfunctional organolithium compounds, for example.

m is an integer of not less than one, and usually an integer of 1 to 10.

Herein, the "polymer block mainly composed of a vinyl aromatic hydrocarbon" designates a copolymer block of a vinyl aromatic hydrocarbon and a conjugated diene compound and/or a vinyl aromatic hydrocarbon homopolymer block, the copolymer block containing not less than 50% by mass and preferably not less than 70% by mass of the vinyl aromatic hydrocarbon.

Moreover, herein, the "polymer block mainly composed of a conjugated diene compound" designates a copolymer block of a conjugated diene compound and a vinyl aromatic hydrocarbon and/or a conjugated diene compound homopolymer block, the copolymer block containing the conjugated diene compound more than 50% by mass and preferably not less than 70% by mass.

The vinyl aromatic hydrocarbon may be distributed uniformly or may be distributed in a tapered state in the block copolymer of the (1-A) hydrogenated block copolymer before hydrogenation and the block copolymer of the (1-B) hydrogenated block copolymer before hydrogenation.

Moreover, a plurality of portions where the vinyl aromatic hydrocarbon is distributed uniformly and/or a plurality of portions where the vinyl aromatic hydrocarbon is distributed in a tapered state may exist together.

The hydrogenated block copolymers (1) that constitute the adhesive composition according to the present embodiment may be an arbitrary combination of the respective hydrogenated products of the block copolymers represented by the general formulas mentioned above.

The vinyl bond amounts V (%) of the (1-A) hydrogenated block copolymer and the (1-B) hydrogenated block copolymer based on the conjugated diene compound before hydrogenation that constitutes the block copolymer are each preferably 10 to 80%, more preferably 20 to 70%, still more preferably 25 to 70%, and further still more preferably 25 to 37%.

Here, the "vinyl bond amount" means a ratio of the conjugated diene compounds incorporated with the 1,2-bond and 3,4-bond among the conjugated diene compounds incorporated with bonding patterns of the 1,2-bond, 3,4-bond and 1,4-bond in the block copolymer.

When the "vinyl bond amount" is less than 10% by mass or more than 80% by mass, the affinity of the hydrogenated block copolymer (1) with the tackifier (2) worsens so that sufficient tackiness is not obtained in the final target adhesive composition.

The "vinyl bond amount V (%)" can be adjusted when the block copolymer is produced using ether compounds such as dimethyl ether, diethylether, diphenyl ether, tetrahydrofuran, diethylene glycol dimethyl ether, and diethylene glycol dibutyl ether; or tertiary amines such as trimethylamine, triethylamine, N,N,N',N'-tetramethylethylene diamine, and diazobicyclo[2,2,2]octane as a vinylating agent.

The (1-A) hydrogenated block copolymer and the (1-B) hydrogenated block copolymer are obtained by hydrogenating each of the block copolymers mentioned above (hydrogenation reaction).

Examples of a catalyst for the hydrogenation reaction include supported heterogeneous catalysts in which a metal such as Ni, Pt, Pd, and Ru is supported on carbon, silica, alumina, diatom earth, and the like; the so-called Ziegler type catalysts using a transition metal salt such as an organic acid salt of Ni, Co, Fe, and Cr or an acetylacetone salt thereof, and a reducing agent such as organic aluminum; and homogeneous catalysts such as the so-called organometallic complexes such as organometallic compounds of Ti, Ru, Rh, and Zr.

Examples of the method for the hydrogenation reaction include methods described in Japanese Patent Publication No. 42-8704, Japanese Patent Publication No. 43-6636, Japanese Patent Publication No. 63-4841, Japanese Patent Publication No. 01-37970, Japanese Patent Publication No. 01-53851, and Japanese Patent Publication No. 02-9041.

Specifically, a hydrogenated product is obtained by performing hydrogenation in a hydrocarbon solvent under presence of a hydrogenation catalyst.

At that time, the degree of hydrogenation of the block copolymer can be controlled by adjusting a reaction temperature, a reaction time, the amount of hydrogen to be supplied, the amount of the catalyst, and the like.

In the (1-A) hydrogenated block copolymer and the (1-B) hydrogenated block copolymer, the total degree of hydrogenation H (%) of unsaturated double bonds based on the conjugated diene compound is 10 to 80%. In the relationship with the vinyl bond amount V (%) based on the conjugated diene compound that constitutes the block copolymer before the hydrogenation, a relationship of $V \leq H \leq 2 \times V + 10$ is preferably satisfied, and a relationship of $V \leq H \leq V + 20$ is more preferably satisfied.

Here, $H \leq 80$, preferably $H \leq 75$, more preferably $H \leq 70$, and still more preferably $H \leq 65\%$.

When the total degree of hydrogenation H (%) of unsaturated double bonds based on the conjugated diene compound is less than 10%, the thermal stability of the adhesive composition finally obtained is inferior. When the total degree of hydrogenation H (%) exceeds 80%, the tackiness of the adhesive composition finally obtained is inferior. Accordingly, both cases are not preferable.

Moreover, in the case where the degree of hydrogenation H (%) is less than the vinyl bond amount V (%), the thermal stability of the adhesive composition finally obtained is inferior. In the case where the degree of hydrogenation H (%) exceeds the upper limit of $V \leq H \leq 2 \times V + 10$, the tackiness of the adhesive composition finally obtained is inferior. Accordingly, both cases are not preferable.

Further, when the total degree of hydrogenation H (%) of unsaturated double bonds based on the conjugated diene compound satisfies $V \leq H \leq 2 \times V + 10$ and H exceeds 80%, the tackiness of the adhesive composition finally obtained is inferior. Accordingly, the both conditions are preferably satisfied.

The total degree of hydrogenation H (%) of unsaturated double bonds based on the conjugated diene compound can be measured with an infrared spectrophotometer, a nuclear magnetic resonance apparatus (NMR), and the like.

The vinyl bond amount V (%) based on the conjugated diene compound before hydrogenation that constitutes the block copolymer can be measured with a nuclear magnetic resonance apparatus (NMR).

In the (1-A) hydrogenated block copolymer and the (1-B) hydrogenated block copolymer, the degree of hydrogenation of the vinyl bonds in the conjugated diene before hydrogenation (S(%): the ratio of the vinyl bonds hydrogenated based on the vinyl bonds in the conjugated diene) is preferably not less than 82%, more preferably not less than 85%, and still more preferably not less than 87%.

When the degree of hydrogenation is less than 82%, it is not preferable because the stability in melt viscosity of the finally obtained adhesive composition under high temperature heating conditions deteriorates.

The degree of hydrogenation of the vinyl bonds in the conjugated diene before hydrogenation can be measured with an infrared spectrophotometer, a nuclear magnetic resonance apparatus (NMR), and the like.

In the (1-A) hydrogenated block copolymer and the (1-B) hydrogenated block copolymer, the degree of hydrogenation of the aromatic double bonds based on the vinyl aromatic hydrocarbons before hydrogenation is preferably not more than 50%, more preferably not more than 30%, and still more preferably not more than 20%.

The degree of hydrogenation of the aromatic double bonds based on the vinyl aromatic hydrocarbons before hydrogenation can be measured with an infrared spectrophotometer, a nuclear magnetic resonance apparatus (NMR), and the like.
(Content of the Vinyl Aromatic Hydrocarbons in the Hydrogenated Block Copolymers (1-A) and (1-B))

The content of the vinyl aromatic hydrocarbons in the (1-A) hydrogenated block copolymer and the (1-B) hydrogenated block copolymer is 20 to 60% by mass, preferably 30 to 60% by mass, and more preferably 37 to 60% by mass.

When the content of the vinyl aromatic hydrocarbons is less than 20% by mass, the retentivity of the adhesive composition finally obtained deteriorates. When the content of the vinyl aromatic hydrocarbons of more than 60% by mass, the tackiness of the adhesive composition finally obtained deteriorates.
(Molecular Weight of the Hydrogenated Block Copolymers (1-A) and (1-B))

The (1-A) hydrogenated block copolymer has a peak molecular weight of 30,000 to 60,000 measured by gel permeation chromatography (GPC) with polystyrene as standard, and preferably a peak molecular weight of 35,000 to 55,000.

At a peak molecular weight of the (1-A) hydrogenated block copolymer of less than 30,000, the retentivity of the final target adhesive composition deteriorates. At a peak molecular weight of the (1-A) hydrogenated block copolymer exceeding 60,000, the melt viscosity is increased so that application performance of the adhesive composition and the like deteriorate. Accordingly, both cases are not preferable.

Moreover, the (1-B) hydrogenated block copolymer has a peak molecular weight of more than 60,000 and less than 100,000 measured by GPC with polystyrene as standard, and preferably a peak molecular weight of 65,000 to 95,000. When the peak molecular weight of the (1-B) hydrogenated block copolymer is not more than 60,000, the retentivity of the final target adhesive composition deteriorates. When the peak molecular weight of the (1-B) hydrogenated block copolymer is not less than 100,000, the melt viscosity is increased so that application performance of the adhesive composition and the like also deteriorate. Accordingly, both cases are not preferable.

(Content of the Hydrogenated Block Copolymers (1-A) and (1-B))

The hydrogenated block copolymer (1) contains 30 to 90% by mass of the (1-A) hydrogenated block copolymer and preferably 40 to 85% by mass, and 70 to 10% by mass of the (1-B) hydrogenated block copolymer and preferably 65 to 15% by mass.

Thereby, a well-balanced adhesive composition in the retentivity, the tackiness, the melt viscosity, and the like is obtained.

(Molecular Weight of the Hydrogenated Block Copolymer (1))

From the viewpoint of the balance between the retentivity and the tackiness of the final target adhesive composition and the melt viscosity thereof, the molecular weight of the hydrogenated block copolymer (the peak molecular weight measured by GPC with polystyrene as standard) (1) is preferably 35,000 to 95,000, and more preferably 40,000 to 90,000.

[Method for Producing the Hydrogenated Block Copolymer (1)]

The hydrogenated block copolymer (1) is obtained as follows, for example: two kinds of block copolymers that are styrene butadiene block copolymers and have a different molecular weight are produced separately using a method for polymerizing styrene in an inert hydrocarbon solvent by using an organolithium compound as a polymerization initiator, then, polymerizing butadiene, and further repeating these operations depending on cases; the two kinds of block copolymers are subjected to the hydrogenation reaction; and subsequently, these hydrogenated block copolymers are mixed with each other.

The molecular weight of the hydrogenated block copolymer (1) can be controlled by adjusting the amount of the organolithium compound.

Mixing the hydrogenated block copolymers is conducted as follows: the hydrogenation reaction is conducted after the end of the polymerization reaction; polymerization solutions of the respective components to which water, an alcohol, an acid, or the like is added to deactivate active species are blended in a predetermined composition; subsequently, for example, steam stripping or the like is conducted to separate the blended polymerization solvent, and drying is performed.

Moreover, the polymers separately obtained by separating and drying the polymerization solvent may be blended with a predetermined roll or the like.

The hydrogenated block copolymer (1) can also be produced with a production method different from the above-mentioned method.

Namely, after the (1-A) hydrogenated block copolymer is obtained, an appropriate coupling agent having not less than two functional groups with a predetermined amount relative to the organolithium compound used as the polymerization initiator is added to the polymerization system to obtain a copolymer product as a component (1-B). Thus, the hydrogenated block copolymers (1-A) and (1-B) are simultaneously obtained within the same reaction system.

According to this method, the peak molecular weight of the component (1-B) is an integral multiple of the peak molecular weight of the component (1-A) according to the coupling agent, the content of the monoalkenyl aromatic compound in the component (1-A) is the same as that in the component (1-B). Although the structure is limited, the method is more industrially advantageous than the method mentioned above.

In the above-mentioned production method, bifunctional, trifunctional, tetrafunctional, pentafunctional, and hexafunctional coupling agents are used as the coupling agent. Particularly, the bifunctional coupling agent is preferable. Examples thereof include halogenated silicon compounds such as dichloro dimethylsilane and phenylmethyl dichlorosilane; alkoxy silicon compounds such as dimethyldimethoxysilane; tin compounds such as dichloro dimethyltin; ester compounds such as methyl benzoate; vinyl allenes such as divinylbenzene; and bifunctional epoxy compounds.

The hydrogenated block copolymers (1-A) and (1-B) mentioned above may have a form of a modified polymer in which a polar group containing functional group selected from nitrogen, oxygen, silicon, phosphorus, sulfur, and tin is bonded to a polymer, or that of a modified block copolymer in which a hydrogenated block copolymer is modified by maleic acid anhydride or the like.

The hydrogenated block copolymer (1) is obtained by performing desolventization by a known method from the solution of the hydrogenated block copolymer (1) produced with the production method mentioned above. At this time, metals may be deashed when necessary, and a predetermined reaction terminator, antioxidant, neutralizer, surface active agent, and the like may be used.

[(2) Tackifier]

A material for the tackifier that constitutes the adhesive composition according to the present embodiment is not particularly limited. Examples thereof include resins having known adhesion assignment function, such as rosin terpene resins, hydrogenated rosin terpene resins, cumarone resins, phenol resins, terpene-phenol resins, aromatic hydrocarbon resins, and aliphatic hydrocarbon resins. Other than these, specifically, tackifiers described in "Compounding Ingredients for Rubber and Plastics" (edited by Rubber Digest Co., Ltd.), can be used.

These may be used alone, or not less than two kinds thereof may be mixed and used.

The amount of the tackifier (2) used is 20 to 400 parts by mass of the tackifier (2) based on 100 parts by mass of the hydrogenated block copolymer (1), and preferably 50 to 350 parts by mass.

When the amount of the tackifier (2) is less than 20 parts by mass, sufficient tack strength is not obtained. On the other hand, when the amount of the tackifier (2) exceeds 400 parts by mass, the retentivity deteriorates. In the both cases, tacky and adhesive properties deteriorate.

[Softener]

Known naphthene based, paraffin based, and aroma based process oils may also be used for the adhesive composition in the present embodiment as a softening material. These may be used alone, or may be mixed and used.

Use of the softener reduces the viscosity of the adhesive composition so that effects of improvement in processability and that in adhesive improvement are obtained.

However, the aroma based oils are likely to impair the color tone and the thermal stability of the final target adhesive composition. For that reason, it is necessary to determine the amount of the softener to be used according to a purpose.

Specifically, in the case where the adhesive composition according to the present embodiment is used as an adhesive composition, the amount of the softener is preferably 0 to 50 parts by mass based on 100 parts by mass of the hydrogenated block copolymer (1), more preferably 0 to 30 parts by mass, and still more preferably 0 to 20 parts by mass. When the amount of the softener to be added exceeds 50 parts by mass, sufficient adhesiveness may not be obtained in the adhesive composition.

On the other hand, in the case where the adhesive composition according to the present embodiment is used as a tacky composition, the amount of the softener is preferably 10 to 200 parts by mass based on 100 parts by mass of the hydrogenated block copolymer (1), and more preferably 20 to 180 parts by mass, and still more preferably 30 to 150 parts by mass. When the amount of the softener exceeds 200 parts by mass, sufficient retentivity may not be obtained.

[Additives]

Various additives such as an antioxidant and a light stabilizer may be added to the adhesive composition in the present embodiment when necessary.

Examples of the antioxidant include hindered phenolic antioxidants such as 2,6-di-tert-butyl-4-methylphenol, n-octadecyl-3-(4'-hydroxy-3',5'-di-tert-butylphenyl)propionate, 2,2'-methylenebis(4-methyl-6-tert-butylphenol), 2,2'-methylenebis(4-ethyl-6-tert-butylphenol), 2,4-bis[(octylthio)methyl]-O-cresol, 2-tert-butyl-6-(3-tert-butyl-2-hydroxy-5-methylbenzyl)-4-methylphenylacrylate, 2,4-di-tert-amyl-6-[1-(3,5-di-tert-amyl-2-hydroxyphenyl)ethyl]phenylacrylate, and 2-[1-(2-hydroxy-3,5-di-tert-pentylphenyl)]acrylate; sulfur based antioxidants such as dilauryl thiodipropionate and lauryl stearyl thiodipropionate pentaerythritol-tetrakis(β-laurylthio propionate); and phosphorus based antioxidants such as tris(nonylphenyl)phosphite and tris(2,4-di-tert-butylphenyl)phosphite.

Examples of the light stabilizer include benzotriazol based ultraviolet absorbing agents such as 2-(2'-hydroxy-5'-methylphenyl)benzotriazol, 2-(2'-hydroxy-3',5'-tert-butylphenyl)benzotriazol, and 2-(2'-hydroxy-3',5'-di-tert-butylphenyl)-5-chlorobenzotriazole; benzophenone based ultraviolet absorbing agents such as 2-hydroxy-4-methoxybenzophenone; and hindered amine light stabilizers.

Moreover, pigments such as red iron oxide and titanium dioxide; waxes such as paraffin wax, microcrystalline wax, and low molecular weight polyethylene wax; polyolefin based or low molecular weight vinyl aromatic based thermoplastic resins such as amorphous polyolefins and ethylene ethyl acrylate copolymers; natural rubbers; and synthetic rubbers such as polyisoprene rubbers, polybutadiene rubbers, styrene-butadiene rubbers, ethylene-propylene rubbers, chloroprene rubbers, acrylic rubbers, isoprene-isobutylene rubbers, polypentenamer rubbers, and styrene-isoprene based block copolymers may be added to the adhesive composition in the present embodiment when necessary.

[Method for Producing an Adhesive Composition]

The adhesive composition in the present embodiment can be produced with a known method.

For example, the adhesive composition can be produced by evenly mixing the hydrogenated block copolymer (1) mentioned above with the tackifier (2) under heating conditions using a predetermined mixer, kneader, or the like.

EXAMPLES

Hereinafter, the present invention will be more specifically described using Examples and Comparative Examples, but the present invention will not be limited to the Examples below.

First, a hydrogenated block copolymer (1) serving as a raw material was produced, and identified by measuring physical properties, and classified as Polymers 1 to 10.

<Method for Measuring Physical Properties>

(Content of Styrene)

The content of styrene was calculated at an absorption intensity of 262 nm using an ultraviolet spectrophotometer (UV200, manufactured by Hitachi, Ltd.).

(Peak Molecular Weight and Composition Ratio)

GPC (a measuring apparatus: manufactured by Waters Co., Ltd.; columns: three columns in total, two ZORBAX PSM 1000S's and one PSM60-S manufactured by E. I. du Pont de Nemours) was used, and tetrahydrofuran was used as a solvent. The measurement condition was at a temperature of 35° C.

With respect to the peak molecular weight, the molecular weight at a peak of the chromatogram was determined using a calibration curve determined from measurement of commercially available standard polystyrene (created using a peak molecular weight of standard polystyrene).

The composition ratio in the case where the hydrogenated block copolymer (1) was composed of a (1-A) hydrogenated block copolymer and a (1-B) hydrogenated block copolymer was calculated based on a surface ratio of each peak of the chromatogram.

(Vinyl Bond Amount and Degree of Hydrogenation)

The vinyl bond amount and the degree of hydrogenation were measured using a nuclear magnetic resonance apparatus (manufactured by Bruker Corporation, DPX-400).

<Preparation of a Block Copolymer and its Hydrogenated Product>

An autoclave having a volume of 100 L and including a stirrer and a jacket was washed, dried, and subjected to replacement by nitrogen. A cyclohexane solution containing 40 parts by mass of styrene and subjected to a purification treatment in advance was placed into the autoclave.

Next, n-butyllithium and tetramethylethylene diamine were added, and the polymerization reaction was conducted at 70° C. for 1 hour.

Subsequently, a cyclohexane solution containing 60 parts by mass of butadiene and subjected to a purification treatment in advance was added, and the polymerization reaction was conducted for 1 hour.

Then, phenylmethyl dichlorosilane was added as a coupling agent to perform coupling, and a mixture of a coupled polymer and an uncoupled polymer was obtained.

A part of the obtained block copolymer solutions was sampled, and 0.3 parts by mass of octadecyl-3-(3,5-dibutyl-tert-butyl-4-hydroxyphenyl)propionate was added to 100 parts by mass of the block copolymer. Subsequently, the solution was heated to remove the solvent.

The block copolymer thus obtained was referred to as Polymer 1.

In Polymer 1, the content of styrene was 40% by mass, the 1,2-vinyl bond amount of polybutadiene was 34% by mass, and the molecular weight was 88,000.

Next, the block copolymer solution at a stage prior to sampling was hydrogenated under a temperature condition of 70° C. by using di-p-tolyl bis(1-cyclopentadienyl)titanium and n-butyllithium as a hydrogenation catalyst. A part of the polymer solution was sampled and was referred to as Polymer 2.

In this Polymer 2, the total degree of hydrogenation H of unsaturated double bonds based on butadiene (hereinafter, referred to as the "degree of hydrogenation H.") was 41%, and the degree of hydrogenation of vinyl bonds was 92%.

The amounts of n-butyllithium, tetramethylethylene diamine, and phenylmethyl dichlorosilane to be added were changed. While other conditions were the same, polymerization was conducted with the same method as in the case of Polymer 1 mentioned above to obtain a block copolymer solution.

Subsequently, hydrogenation was conducted with the same method as in the case of Polymer 2 mentioned above using this block copolymer solution. Thus, Polymer 3 to Polymer 12 were produced.

Table 1 below shows the properties of Polymers 1 to 12.

(Tack Strength (N/10 mm))

A sample having a width of 25 mm was attached to a stainless plate, and the 180° peel-off force of the sample was measured at a peeling rate: 300 mm/min.

TABLE 1

| Polymer | Vinyl bond amount V (%) | Degree of hydrogenation H (%) | Degree of hydrogenation S of vinyl bonds (%) | Content of styrene (%) | Peak molecular weight of component (1-A) (×10,000) | Peak molecular weight of component (1-B) (×10,000) | (1-A)/ (1-B) |
|---|---|---|---|---|---|---|---|
| Polymer 1 | 34 | 0 | 0 | 40 | 4.1 | 8.8 | 64/36 |
| Polymer 2 | 34 | 41 | 92 | 40 | 4.1 | 8.8 | 64/36 |
| Polymer 3 | 34 | 43 | 95 | 40 | 4.6 | 9.5 | 49/51 |
| Polymer 4 | 36 | 44 | 95 | 40 | 4.3 | 9.0 | 78/22 |
| Polymer 5 | 30 | 42 | 97 | 48 | 3.3 | 6.8 | 80/20 |
| Polymer 6 | 29 | 42 | 98 | 47 | 3.1 | 6.5 | 48/52 |
| Polymer 7 | 40 | 48 | 93 | 40 | 4.5 | 9.4 | 50/50 |
| Polymer 8 | 34 | 42 | 94 | 35 | 4.2 | 9.0 | 65/35 |
| Polymer 9 | 32 | 39 | 97 | 40 | 5.0 | 10.5 | 32/68 |
| Polymer 10 | 35 | 40 | 92 | 48 | 4.9 | 10.3 | 95/5 |
| Polymer 11 | 33 | 41 | 91 | 40 | 2.8 | 5.8 | 46/54 |
| Polymer 12 | 34 | 39 | 94 | 48 | 2.7 | 5.6 | 76/34 |

Next, samples of the adhesive composition were produced using Polymers 1 to 12 produced as mentioned above.

Examples 1 to 7, Comparative Examples 1 to 5

(Hydrogenated) block copolymer (or Polymers 1 to 10): 100 parts by mass
Tackifier (ARKON M100 (manufactured by Arakawa Chemical Industries, Ltd.)): 300 parts by mass
Softener (Diana Process Oil PW-90 (manufactured by Idemitsu Kosan Co., Ltd.)): 100 parts by mass These were blended and melt kneaded with a 1-L container having a stirrer at 180° C. for 2 hours to obtain a target hot-melt adhesive composition.

In the adhesive composition, 1 part by mass of 2-tert-butyl-6-(3-tert-butyl-2-hydroxy-5-methylbenzyl)-4-methylphenylacrylate was blended as a stabilizer based on 100 parts by mass of the (hydrogenated) block copolymer (Polymers 1 to 10).

Comparative Examples 6 and 7

An adhesive composition was produced by the same method under the same condition as that in Example 1 except that the amounts of the tackifier and the softener to be blended were changed.

<Measurement and Evaluation of the Adhesive Composition>

The following physical properties were measured with respect to the adhesive compositions of Examples 1 to 7 and Comparative Examples 1 to 7.

Table 2 below shows measurement results.

(Melt Viscosity)

Using a Brookfield type viscometer, the melt viscosity of the adhesive composition under a temperature condition of 140° C. was measured.

(Loop Tack (N/15 mm))

A looped sample having a length of 250 mm×a width of 15 mm was used, and measured at a contact area of 15 mm×50 mm, an adhesion time of 3 sec, and an adhesion and peeling rate of 500 mm/min, using a stainless plate as a body to be attached.

(Retentivity (Minutes))

The retentivity was measured according to JIS Z-1524.

Namely, an adhesive tape was attached to a stainless plate so that an area of 25 mm×25 mm of the adhesive tape might contact the stainless plate, and a time until the adhesive tape slipped down was measured by applying 1 kg of load to the adhesive tape at 60° C.

(Rate of Change in Melt Viscosity (%))

Using a Brookfield type viscometer, a rate of change in the melt viscosity below was determined when $\eta 0$ was the melt viscosity of the adhesive composition immediately after kneading at 180° C. and $\eta 1$ was the melt viscosity at 180° C. in 48 hours after the adhesive composition was left as it was under a temperature atmosphere at 180° C. This was used as a scale for thermal stability.

$$\text{Rate of change in melt viscosity (\%)} = \frac{\eta 1 - \eta 0}{\eta 0} \times 100$$

With respect to each of the melt viscosity, the loop tack, the tack strength, the retentivity, and the rate of change in melt viscosity, a decision criteria that it is practically good are shown below.

The melt viscosity is not more than 3000 cP. When the melt viscosity exceeds this value, processability deteriorates.

The loop tack is not less than 4.0 N/15 mm. When the loop tack is less than this value, initial tackiness is inferior so that adhesion is difficult.

The tack strength is not less than 5.0 N/10 mm. When the tack strength is less than this value, peel-off easily occurs.

The retentivity is not less than 50 minutes. When the retentivity is less than this value, peel-off easily occurs for a shearing force.

The rate of change in melt viscosity is −35 to +35%. Larger change than this makes stable coating impossible.

TABLE 2

| | Blending amount (parts by mass) | | | Kind of component (1) | Melt viscosity (cP, at. 140° C.) | Tack | | Retentivity (minutes) | Rate of change in melt viscosity (%) |
|---|---|---|---|---|---|---|---|---|---|
| | Component (1) | Component (2) | Component (3) | | | Loop tack (N/15 mm) | strength (N/10 mm) | | |
| Example 1 | 100 | 300 | 100 | Polymer 2 | 1,450 | 4.8 | 6.1 | 96 | −22 |
| Example 2 | 100 | 300 | 100 | Polymer 3 | 900 | 9.8 | 6 | 70 | −29 |
| Example 3 | 100 | 300 | 100 | Polymer 4 | 2,100 | 4.6 | 8 | 234 | −30 |
| Example 4 | 100 | 300 | 100 | Polymer 5 | 740 | 5.8 | 9.3 | 56 | −27 |
| Example 5 | 100 | 300 | 100 | Polymer 6 | 2,600 | 4.9 | 9.1 | 587 | −28 |
| Example 6 | 100 | 300 | 100 | Polymer 7 | 1,850 | 4.2 | 5.5 | 160 | −27 |
| Example 7 | 100 | 300 | 100 | Polymer 8 | 1,600 | 10.2 | 5 | 40 | −32 |
| Comparative Example 1 | 100 | 300 | 100 | Polymer 1 | 900 | 7.5 | 8.4 | 9 | −25 |
| Comparative Example 2 | 100 | 300 | 100 | Polymer 9 | 4,500 | 2.5 | 4.5 | 285 | −23 |
| Comparative Example 3 | 100 | 300 | 100 | Polymer 10 | 1,020 | 6.2 | 8.5 | 11 | −20 |
| Comparative Example 4 | 100 | 300 | 100 | Polymer 11 | 1,020 | 6.2 | 8.5 | 11 | −20 |
| Comparative Example 5 | 100 | 300 | 100 | Polymer 12 | 800 | 4.5 | 4.7 | 4 | −20 |
| Comparative Example 6 | 100 | 500 | 100 | Polymer 2 | 1,100 | 2.5 | 10.7 | 5 | −18 |
| Comparative Example 7 | 100 | 15 | 100 | Polymer 2 | 3,800 | 5.2 | 0.6 | 800 | 50 |

Component (1): Block copolymer
Component (2): Alicyclic saturated petroleum resin (ARKON M100, made by Arakawa Chemical Industries, Ltd.)
Component (3): Paraffin based process oil (PW-90, made by Idemitsu Kosan Co., Ltd.)

As apparent from Table 2 above, it turned out that the adhesive compositions of Examples 1 to 7 containing 100 parts by mass of the predetermined hydrogenated block copolymer as Component (1) and 20 to 400 parts by mass of the tackifier as Component (2) show good melt viscosity, loop tack, tack strength, and retentivity, and have a small rate of change in melt viscosity under high temperature heating and well-balanced adhesion properties.

In Comparative Example 1, the melt viscosity was low and processability was good because Polymer 1 was a block copolymer not hydrogenated. On the other hand, the retentivity was remarkably reduced, and practically sufficient adhesiveness was not obtained.

In Comparative Example 2, the peak molecular weight of the hydrogenated block copolymer as Component (1-B) of Polymer 9 was too high. For this reason, the melt viscosity was high, the processability deteriorated, and a coating rate was slow. Then, coating at a high temperature was necessary in order to obtain the coating rate, the body to be attached might be damaged, and dealing in thin film formation was difficult. Moreover, aggregation of the hydrogenated block copolymer was excessively high so that the value of the loop tack was reduced. Accordingly, practically sufficient tackiness was not obtained, and adhesion was difficult.

In Comparative Example 3, the hydrogenated block copolymer as Component (1-A) that constituted Polymer 10 was excessively more than the hydrogenated block copolymer as Component (1-B). For this reason, the retentivity was remarkably reduced, and practically sufficient adhesiveness was not obtained.

In Comparative Example 4, the peak molecular weight of the hydrogenated block copolymer as Component (1-B) that constituted Polymer 11 was low. For this reason, the retentivity was remarkably reduced, and practically sufficient adhesiveness was not obtained.

In Comparative Example 5, the peak molecular weight of the hydrogenated block copolymer as Component (1-B) that constituted Polymer 12 was low. For this reason, the tack strength was low, the retentivity was remarkably reduced, and practically sufficient tacky and adhesion properties were not obtained.

In Comparative Example 6, the amount of the tackifier to be blended as Component (2) was excessively large. For this reason, the values of the loop tack and the retentivity were reduced, and practically sufficient tacky and adhesion properties were not obtained.

In Comparative Example 7, the amount of the tackifier to be blended as Component (2) was excessively small. For this reason, the tack strength was remarkably reduced. Moreover, it turned out that in a heat stability test, a part of the hydrogenated copolymer was crosslinked to increase the viscosity so that the rate of change in melt viscosity was very high and the thermal stability was extremely inferior.

This application is based on Japanese Patent Application (Japanese Patent Application No. 2008-104948) filed in the Japanese Patent Office on Apr. 14, 2008, and the content thereof is incorporated herein by reference.

Industrial Applicability

The adhesive composition according to the present invention has extremely well-balanced tacky and adhesive properties, and accordingly, has industrial applicability as various adhesive tapes and labels, pressure sensitive thin plates, pressure sensitive sheets, rear glues for fixing various lightweight plastic molding products, rear glues for fixing carpets, rear glues for fixing tiles, and the like.

The invention claimed is:

1. An adhesive composition comprising 100 parts by mass of (1) a hydrogenated block copolymer and 20 to 400 parts by mass of (2) a tackifier, the hydrogenated block copolymer having 30 to 90% by mass of (1-A) below and 70 to 10% by mass of (1-B) below:

(1-A) a hydrogenated block copolymer that comprises a polymer block mainly composed of a vinyl aromatic hydrocarbon and a polymer block mainly composed of a conjugated diene compound, and satisfies requirements (a) to (c) below:

(a) a total degree of hydrogenation H (%) of unsaturated double bonds based on the conjugated diene compound is 10 to 80%,
(b) a content of the vinyl aromatic hydrocarbon is 30 to 60% by mass, and
(c) a peak molecular weight is 30,000 to 60,000; and
(1-B) a hydrogenated block copolymer that comprises a polymer block mainly composed of not less than two vinyl aromatic hydrocarbons and a polymer block mainly composed of a conjugated diene compound, and satisfies requirements (d) to (f) below:
(d) a total degree of hydrogenation H (%) of unsaturated double bonds based on the conjugated diene compound is 10 to 80%,
(e) a content of the vinyl aromatic hydrocarbons is 30 to 60% by mass, and
(f) a peak molecular weight is from 65,000 to 95,000.

2. The adhesive composition according to claim 1, wherein the (1-A) hydrogenated block copolymer is a hydrogenated block copolymer of a block copolymer comprising a polymer block mainly composed of a vinyl aromatic hydrocarbon and a polymer block mainly composed of a conjugated diene compound, and having 10 to 80% of a vinyl bond amount V (%) based on the conjugated diene compound, a degree of hydrogenation S (%) of vinyl bonds in conjugated diene before hydrogenation is not less than 82%, and the total degree of hydrogenation H (%) of unsaturated double bonds based on the conjugated diene compound satisfies a relationship of $V \leq H \leq 2 \times V + 10$ (wherein $10 \leq H \leq 80$); and the (1-B) hydrogenated block copolymer is a hydrogenated block copolymer of a block copolymer having 10 to 80 % of a vinyl bond amount V (%) based on the conjugated diene compound, a degree of hydrogenation S (%) of vinyl bonds in conjugated diene before hydrogenation is not less than 82 %, and the total degree of hydrogenation H (%) of unsaturated double bonds based on the conjugated diene compound satisfies a relationship of $V \leq H \leq 2 \times V + 10$ (wherein $10 \leq H \leq 80$); and the peak molecular weight is 65,000 to 95,000.

3. The adhesive composition according to claim 1, further comprising a softener.

4. The adhesive composition according to claim 2, further comprising a softener.

* * * * *